United States Patent [19]
Henkel

[11] 3,972,412
[45] Aug. 3, 1976

[54] VERTICAL CONVEYOR

[76] Inventor: Richard Henkel, 4037 Center Ave., Lyons, Ill. 60534

[22] Filed: Oct. 9, 1974

[21] Appl. No.: 513,264

[52] U.S. Cl. ............................. 198/138; 198/158
[51] Int. Cl.² ......................................... B65G 15/00
[58] Field of Search ............ 198/137, 138, 154, 156, 198/157, 158; 214/16.1 BB

[56] References Cited
UNITED STATES PATENTS
| | | | |
|---|---|---|---|
| 1,147,939 | 7/1915 | Greer | 198/137 |
| 3,760,934 | 9/1973 | Olson | 198/158 |

*Primary Examiner*—Evon C. Blunk
*Assistant Examiner*—Joseph E. Valenza
*Attorney, Agent, or Firm*—Barnes, Kisselle, Raisch & Choate

[57] ABSTRACT

A vertical conveyor comprising an endless conveyor chain movable in a closed vertical path and at least one carrier suspended pivotally on the conveyor element. The endless conveyor chain is movable in a first vertical path and a second vertical path through an intermediate curved path. Guide rails guide the carrier along the vertical paths. A slide is positioned adjacent the curved path and is mounted for generally horizontal movement between the vertical paths. Interengaging means are provided between the carrier and the slide for guiding the carrier and maintaining it in vertical position during movement of the carrier through the arcuate path between the vertical paths.

10 Claims, 8 Drawing Figures

VERTICAL CONVEYOR

This invention relates to vertical conveyors.

BACKGROUND OF THE INVENTION

In vertical conveyors, an endless chain is provided in a vertical plane and driven by a drive sprocket usually located at the upper end. One or more carriers or cars are pivotally mounted on the chain and as the chain is moved, they are lowered or raised between different positions so that loads may be unloaded or loaded thereon. Vertical guide rails are usually provided adjacent the vertical portions of the chain. However, when the carrier moves through the arcuate path at the upper and lower ends of the chain, there may be a tendency for the carrier to tilt when it is heavily or unevenly loaded.

Accordingly, among the objects of the invention are to provide a vertical conveyor wherein the tendency of the carriers to tilt is avoided and the carriers are stabilized in a vertical position through the arcuate movement between the vertical paths.

SUMMARY OF THE INVENTION

In accordance with the invention, a slide is positioned adjacent the curved path of the carrier and is mounted for generally horizontal movement between the vertical paths. Interengaging means are provided between the carrier and the slide for guiding the carrier and maintaining it in vertical position during movement through the arcuate path between the vertical paths.

DESCRIPTION

Figure 1:
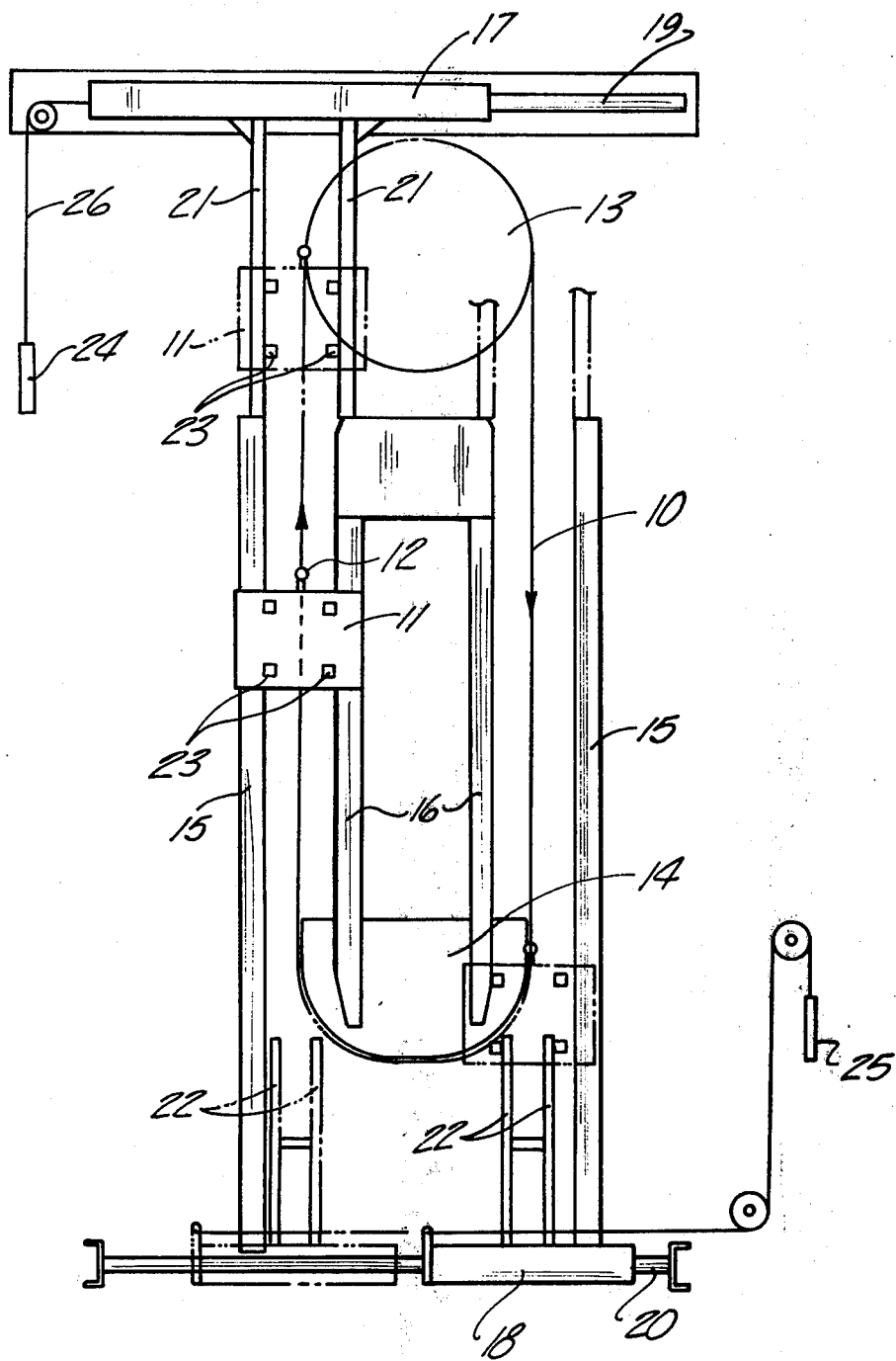
FIG. 1 is a partly diagrammatic view of a conveyor system embodying the invention.
Figure 2:
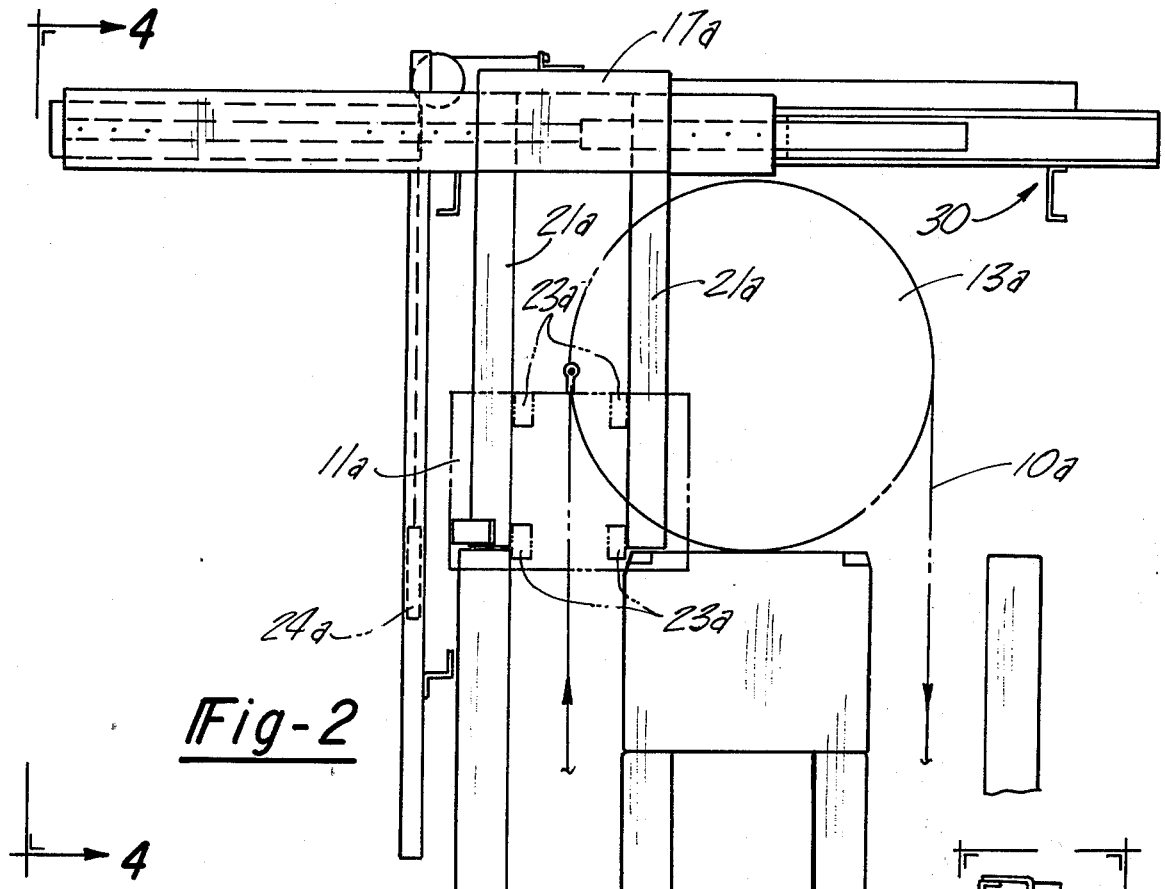
FIG. 2 is a fragmentary elevational view of a conveyor system embodying the invention.
Figure 3:
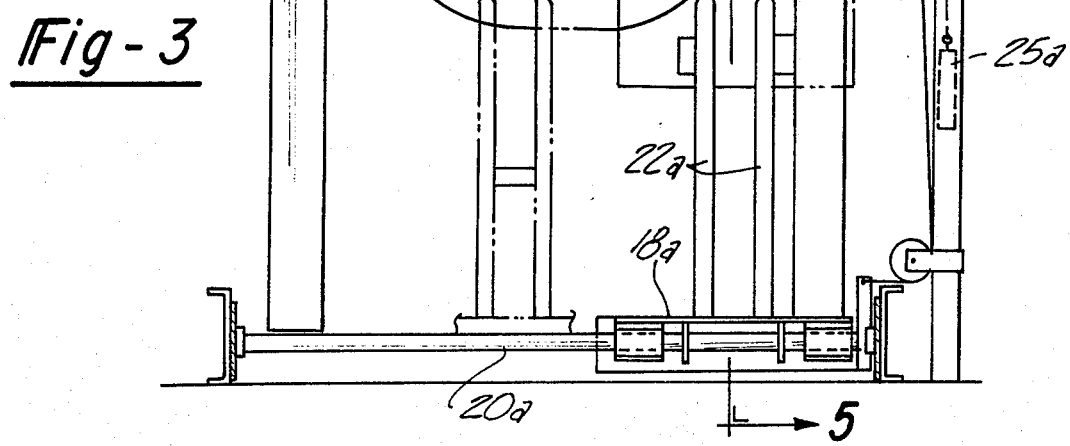
FIG. 3 is a fragmentary view of another portion of the conveyor system embodying the invention.
Figure 4:
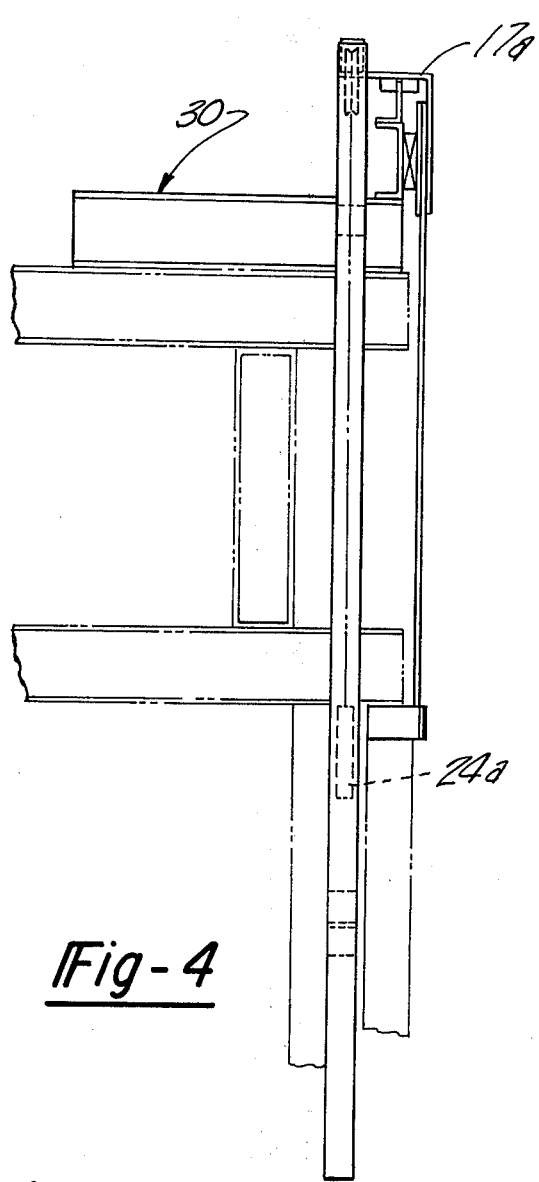
FIG. 4 is a fragmentary sectional view taken along the line 4—4 in FIG. 2.
Figure 5:
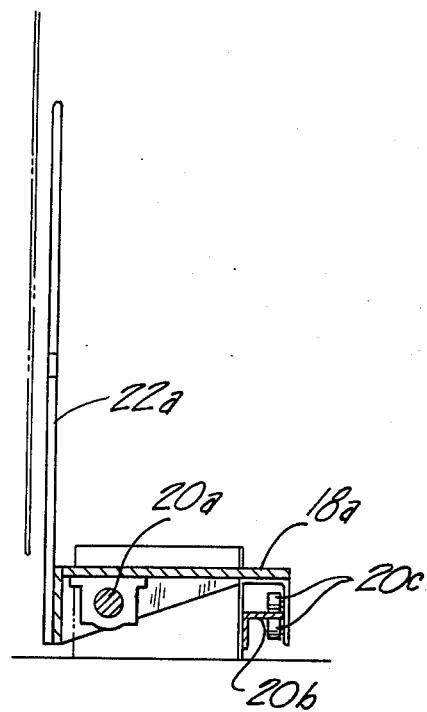
FIG. 5 is a fragmentary sectional view taken along the line 5—5 in FIG. 3.
Figure 6:
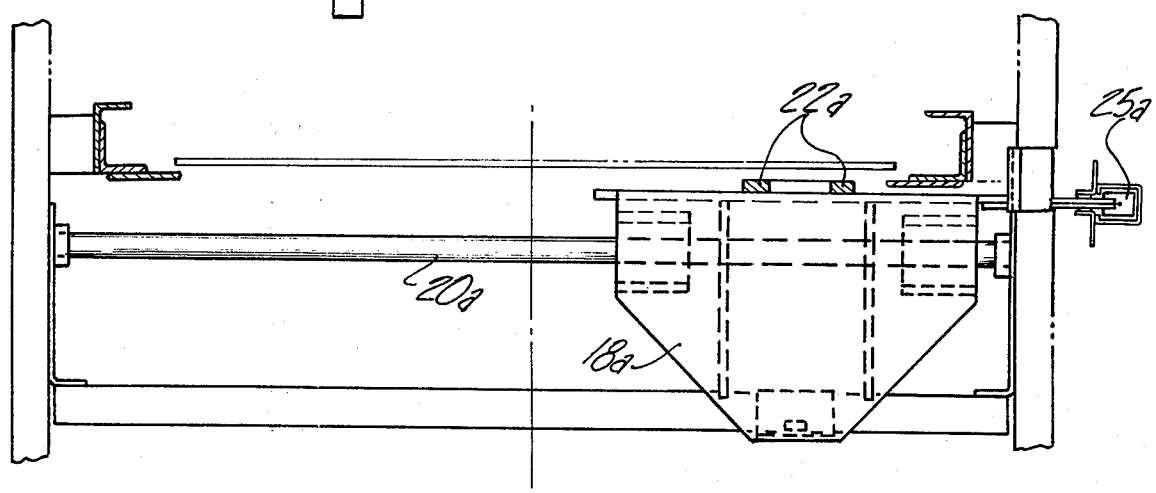
FIG. 6 is a fragmentary sectional view taken along the line 6—6 in FIG. 3.

Referring to FIG. 1, a typical vertical conveyor system comprises an endless chain 10 on which one or more carriers or cars 11 are pivoted as at 12. The chain 10 moves in a vertical plane and is driven by a sprocket 13 at the upper end and guided by a guide 14 at the lower end. Various stations can be provided along the vertical paths at which the carriers 11 are loaded or unloaded. In the movement in the vertical paths, guide rails 15, 16 can be provided.

In accordance with the invention, at the upper and lower ends adjacent the arcuate paths of the chain, slides 17, 18 are provided along tracks 19, 20. Each slide 17, 18 is formed with arms 21, 22 extending vertically therefrom which are adapted to engage pads or shoes 23 on the carrier.

Each slide 17, 18 is counterweighted by a counterweight 24, 25 on the end of the cable 26, 27 that yieldingly urges the slides 17, 18 to a position where they will be engaged by the carrier as it approaches the arcuate path at the upper or lower end, respectively.

Thus, as a carrier 11 approaches the slide 17, the pads or shoes 23 thereon engage the arms 21. Further movement of the chain 10 causes the slide 17 to move horizontally on the track 19 to the right in FIG. 1 and thus the carrier 11 is stabilized vertically in its movement through the arcuate path around the sprocket 13. As the chain further continues, it carries the carrier 11 downwardly out of engagement with the arms 21 in the second vertical path.

Similarly, as the carrier approaches the bottom of the vertical path on the right, the shoes 23 thereon engage the arms 22 and, as it moves in the arcuate path, causes the slide 18 to move to the left guiding the carrier around the arcuate path. Finally, as the carrier is moved upwardly by the chain, it disengages the arms 22 permitting the counterweight 25 to return the slide 18 to its original position.

FIGS. 2–6 show a structural embodiment of the invention as set forth in FIG. 1 comprising a frame 20 that supports the various elements of the conveyor. For purposes of convenience and clarity, the comparable parts are given similar numbers with the suffix a. Thus, the carrier 11a has pads 23a thereon which engage with the arms 21a of the slide 17a to move the slide and thereby guide the carrier around the sprocket 13a. Similarly, the arms 22a on the slide 18a engage the pads 23a of the carrier 11a to guide the carrier around the lower arcuate path. In this construction, the track comprises a shaft 20a and an angle 20b. The slide 18a slides on the shaft 20a and includes rollers 20c engaging the angle 20b.

Figure 8:
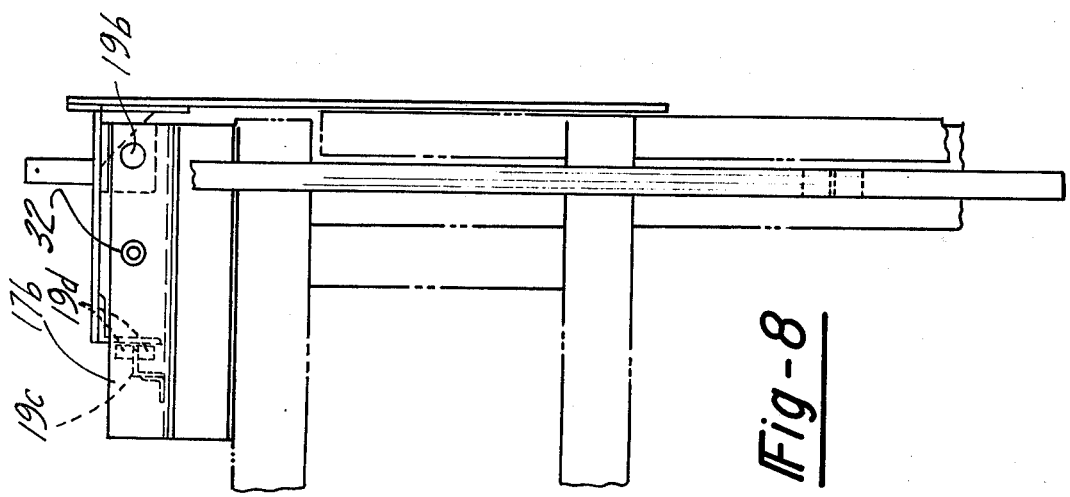
FIG. 8 is a side elevational view of the same.
Figure 7:
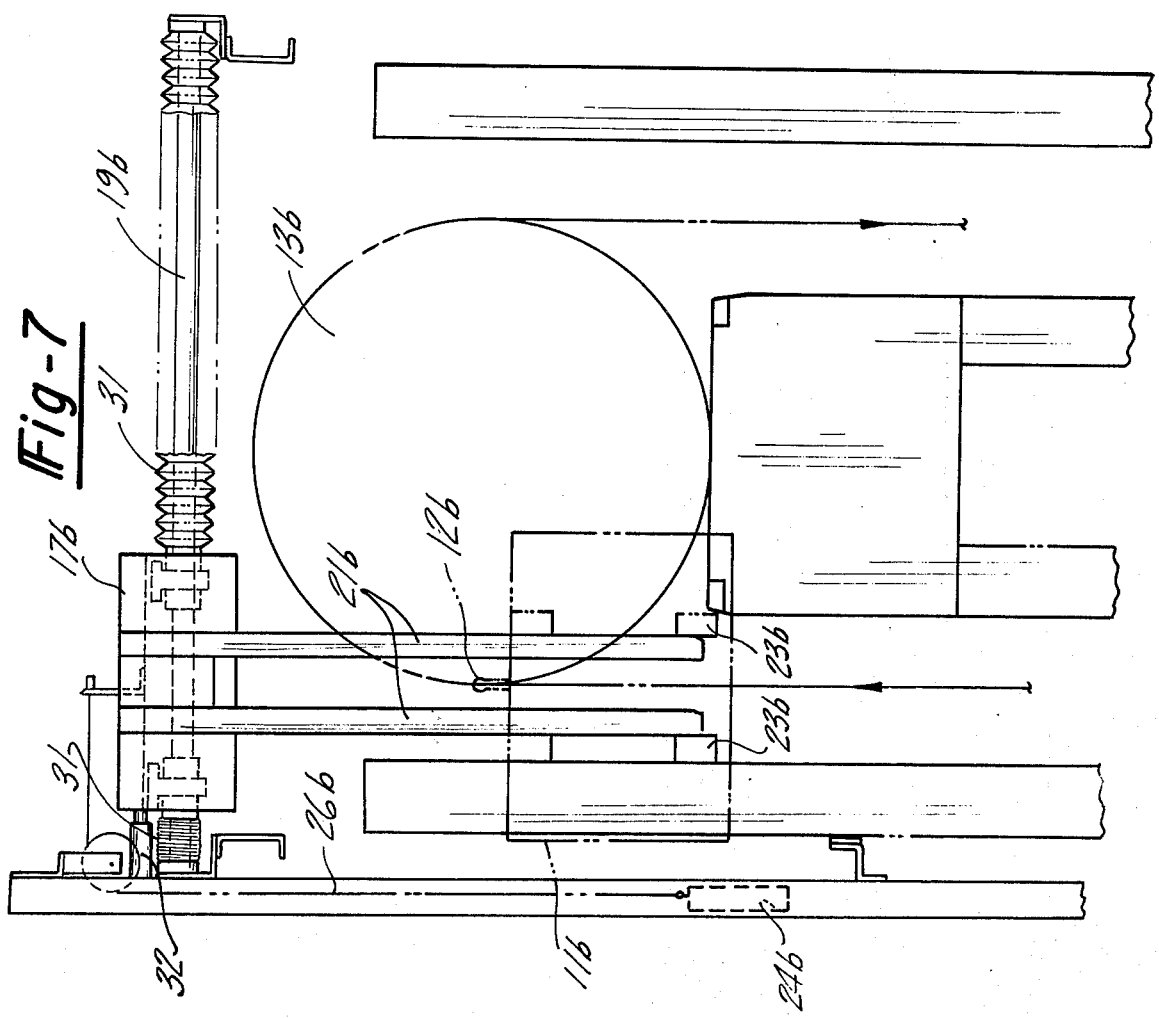
FIG. 7 is a fragmentary elevational view of a modified form of the invention.

In the form of the invention shown in FIGS. 7 and 8, the structure is quite similar with parts being designated with the suffix b. In this form, a boot 31 is provided over the upper track to protect the track from dust. As in the previous form of the invention, the track comprises a shaft 19b and angle 19c and the slide slides on the shaft 19b and has rollers 19d engaging the angle 19c. A similar construction would be provided at the lower end of the conveyor as in FIGS. 5 and 6 with the inclusion of a boot over the shaft of the track.

It can thus be seen that there has been provided in each instance a construction for stabilizing the vertical movement of the carrier as it moves from one vertical path through an arcuate path to another vertical path.

I claim:

1. In a vertical conveyor, the combination comprising an endless element movable in a closed vertical path,
   at least one load carrier suspended pivotally about a transverse axis on said conveyor element and movable in a first vertical path and a second vertical path through an intermediate curved path,
   guide rails along the vertical paths for guiding the carrier,
   a fixed track extending generally horizontally adjacent the curved path and a slide mounted on said track for generally horizontal movement between said vertical paths,
   and interengaging means between the carrier and the slide for guiding the carrier and maintaining it in vertical position during movement through the arcuate path between said vertical paths.

2. The combination set forth in claim 1 including means yieldingly urging said slide toward a position such that it is in the path of the carrier as the carrier moves from the one vertical path to the arcuate path.

3. The combination set forth in claim 2 wherein said last-mentioned means comprises a counterweight attached to the slide.

4. The combination set forth in claim 1 wherein said arcuate path is at the upper end of the vertical paths.

5. The combination set forth in claim 1 wherein said arcuate path is at the lower end of said vertical paths.

6. The combination set forth in claim 1 wherein said interengaging means comprises vertical arms on said slide and shoes on said carrier.

7. In a vertical conveyor, the combination comprising an endless chain movable in a closed vertical path,
at least one load carrier suspended pivotally on said conveyor element about a transverse axis and movable in a first vertical path and a second vertical path through intermediate curved paths at the upper and lower ends of said vertical paths,
a sprocket at the upper ends of said vertical paths for driving said chain,
guide rails along the vertical paths for guiding the carrier,
a fixed track extending generally horizontally adjacent each curved path and a slide mounted on said track for generally horizontal movement between said vertical paths,
and interengaging means between the carrier and the slide for guiding the carrier and maintaining it in vertical position during movement through the arcuate path between said vertical paths.

8. The combination set forth in claim 7 including means yieldingly urging each said slide toward a position such that it is in the path of the carrier as the carrier moves from the one vertical path to the arcuate path.

9. The combination set forth in claim 8 wherein said last-mentioned means comprises a counterweight attached to the slide.

10. The combination set forth in claim 7 wherein said interengaging means comprises vertical arms on said slides and shoes on said carrier.

* * * * *